Feb. 17, 1959 A. CLAUD-MANTLE 2,873,689
CONVEYOR SWITCH DEVICE
Filed Feb. 14, 1955 2 Sheets-Sheet 2
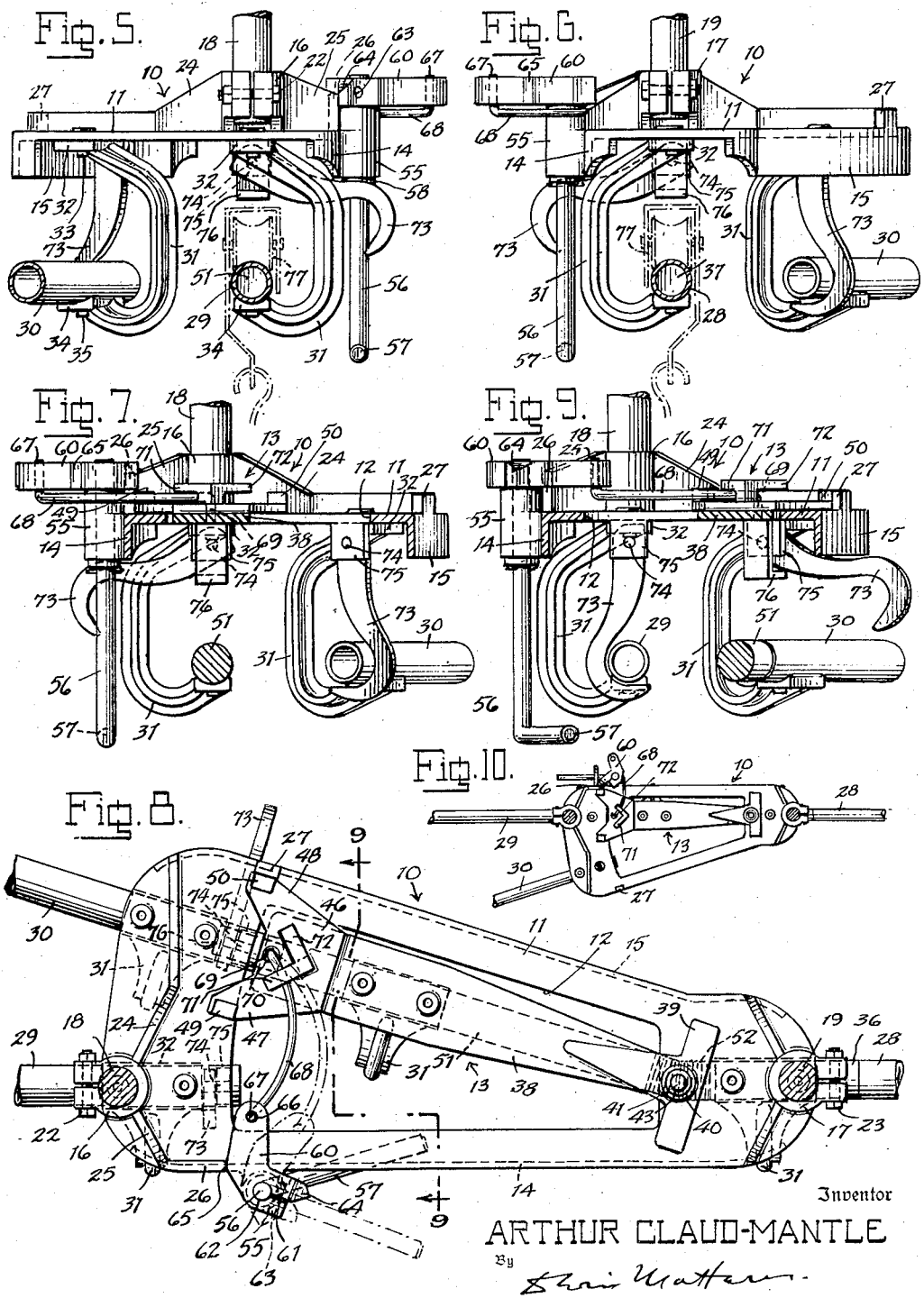
Inventor
ARTHUR CLAUD-MANTLE
Attorney

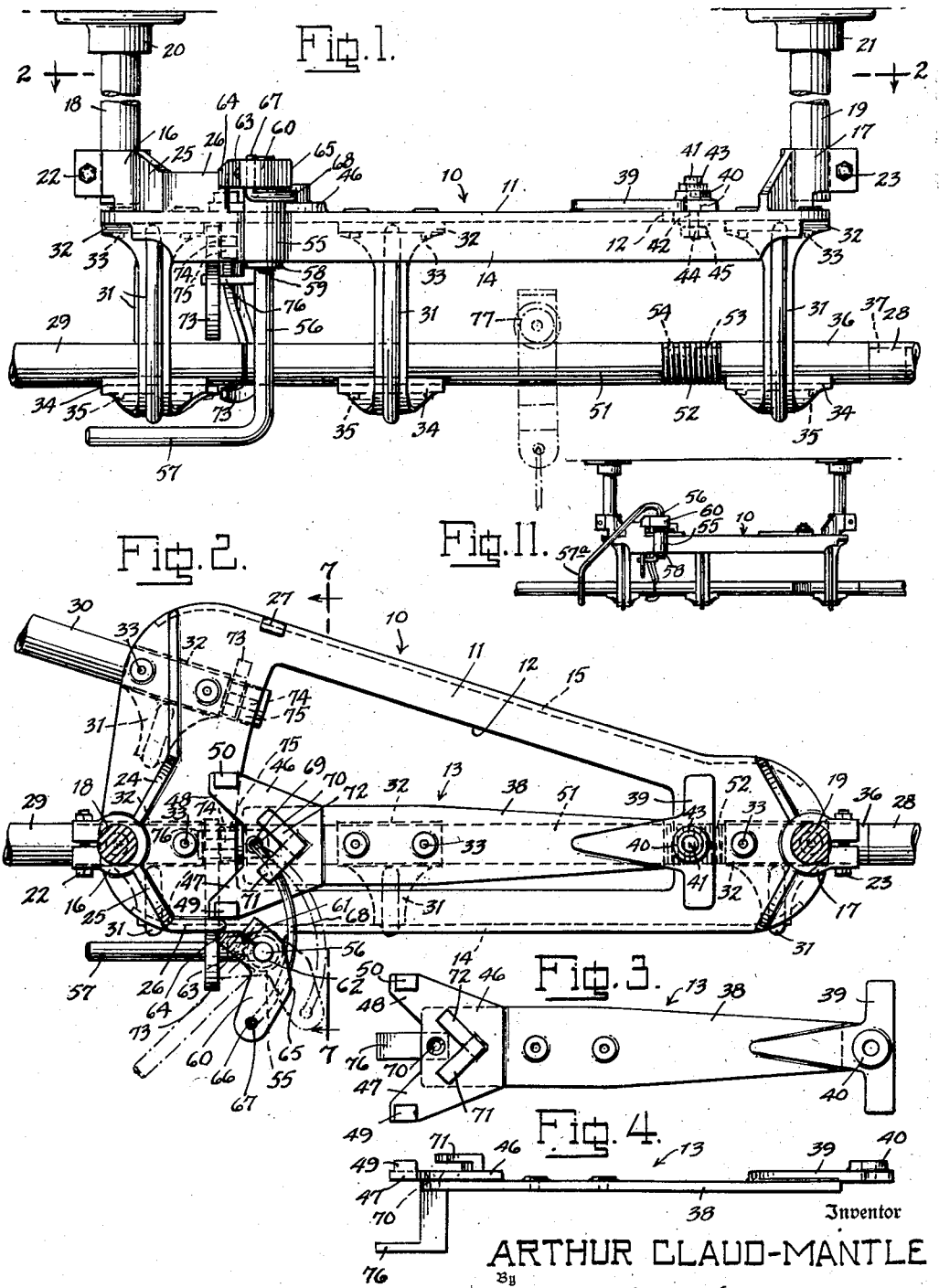

United States Patent Office 2,873,689
Patented Feb. 17, 1959

2,873,689

CONVEYOR SWITCH DEVICE

Arthur Claud-Mantle, Trumbull, Conn., assignor, by mesne assignments, to Tangel Material Handling Equipment, Inc., Long Island City, N. Y., a corporation of New York Application February 14, 1955, Serial No. 487,804

6 Claims. (Cl. 104—103)

The present invention relates to a conveyor switch device, particularly for use in a conveyor system of the type wherein goods or articles supported upon suitable hangers are conveyed upon overhead track rods between various locations in a factory or other establishment.

In such a system the goods are placed upon the conveyor system at one location and thereupon moved to any one of several locations, depending upon the particular operation involved, or conversely, moved from several locations to one location. As one example, such a conveyor system may be used in a dry cleaning establishment where the clothes to be processed are placed upon the conveyor at a receiving point and then carried to different parts of the establishment for different operations thereon as, for instance, dyeing at one location and cleaning at another. Upon completion of the work thereon, they may be returned by means of the conveyor system to the receiving point.

It is an object of the invention to provide a conveyor switch device in the form of a complete self-contained unit which may be readily installed at any desired location in the system to connect a single track rod to either of a pair of branch track rods.

In routing the conveyed articles to different locations an attendant, usually a girl, is stationed at the switching point and by observing tags or other operation identifying means on the goods directs them through actuation of the switch to the desired locations. It is therefore an object of the invention to provide a switch device which may be positively actuated with very little effort.

When the switch is actuated to connect one branch track rod of the system, the unconnected other branch track rod presents a free end, and it is an object of the invention to provide automatic stop means adapted to be brought into relation therewith to prevent movement of a conveyed article beyond such free end, the stop means in relation to the connected branch track rod being automatically moved into inoperative position so that it will not obstruct the passage of the goods thereon. This is particularly important where the conveyor system is being employed to bring the goods from various locations to a single location, i. e., where they are travelling on the branch track rods of the system toward the switch device.

Other objects and advantages of the invention will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

Fig. 1 is a side view of the conveyor switch device of the invention, shown suspended from a ceiling and connected to the track rods of the conveyor system, the dot-and-dash lines showing an article hanger in engagement with the switching track rod;

Fig. 2 is a top plan view, in horizontal section along the line 2—2 of Fig. 1, illustrating the switching track rod of the switch locked in one of its positions, and showing in dot-and-dash lines a moved position of the manually operable actuating means;

Fig. 3 is a top plan view of the switching arm member;

Fig. 4 is a side view of the switching arm member shown in Fig. 3;

Fig. 5 is an end view of the device as seen in Fig. 1, looking from the left hand side thereof;

Fig. 6 is an end view of the device as seen in Fig. 1, looking from the right hand side thereof;

Fig. 7 is a vertical sectional view taken along the line 7—7 of Fig. 2;

Fig. 8 is a top plan view, similar to Fig. 2 and illustrating the switching track rod of the switch locked in its other position, and showing in dot-and-dash lines a moved position of the manually operable actuating means;

Fig. 9 is a vertical sectional view taken along the line 9—9 of Fig. 8;

Fig. 10 is a plan view, on a reduced scale, of a modification in which the main frame is in reverse arrangement to that illustrated in Figs. 1, 2 and 5–9; and Fig. 11 is a side view, on a reduced scale, showing a modified form of operating handle.

Referring to the drawings, the conveyor switch device according to the illustrated exemplary embodiment of the invention, comprises a main frame 10, preferably formed of malleable cast iron and of generally segmental shape in plan, and consisting of a horizontal flat top plate portion 11 having an opening 12 therein of segmental shape with its divergent front and rear side edges parallel to the front and rear side edges of the plate 11, the narrow end edge being transversely disposed to the plate and the wide end edge being concentric to the pivot axis of a switching arm member, indicated generally as 13, movable within the opening, as will hereinafter more fully appear. Along the respective front and rear side edges of the frame there are provided depending flanges 14 and 15 to give rigidity to the frame.

Upon the upper side of the frame, adjacent its ends and along a line parallel to the front side edge of the frame, there are respectively provided split collar members 16 and 17 integrally formed with the plate and which receive the lower ends of vertical hanger pipe members 18 and 19 extending from the ceiling of the establishment in which the conveyor system is installed. The hanger pipe members are secured to the ceiling by suitable flanged hub members 20 and 21, and the collar members are clamped about the lower ends of the pipe members by means of tightening bolts 22 and 23. Strengthening ribs 24 and 25 extend from the clamping collar 16 along the upper side of the top plate portion 11 to the side edges thereof, the rib 25 having an extension portion 26 extending along the front side edge of the plate for a short distance to constitute a stop means for limiting movement in one direction of the switching arm, as will presently more fully appear, a stop lug 27, being provided upon the top plate adjacent the rear side edge to limit the movement of the switching arm in the other direction.

Beneath the frame 10 there is connected at its narrow end the horizontally extending cylindrical tubular track rod 28 which extends to the switch device from a suitable location in the establishment which, for the purpose of the present description, may be referred to as a dispatching station, and to the wide end there are connected a pair of cylindrical tubular track rods 29 and 30 which extend to two receiving stations of the conveyor system. The track rod 29 is in a straight longitudinal line with the track rod 28, and the track rod 30 extends from the switch device at a divergent angle to the track rod 29, its axis being in a line intersecting the pivot point of the switching arm 13, which pivot point is also in line with the longitudinal axis of the rods 28 and 29.

The track rods are connected to the frame by means of a suitable number of hanger brackets 31, these being of identical form. These brackets are of generally C-shape and each is provided at its upper end with a flat attaching plate portion 32, which is secured to the underside of the plate portion 11 of the frame by screws 33, and at its lower end with a longitudinally grooved saddle portion 34. The radius of curvature of the groove corresponds to the radius of the cylindrical track rods, which may thus seat therein and be secured by screws 35. One such hanger bracket is secured to the narrow end of the frame and has secured to it a stub track rod section 36 in longitudinal line with the track sections 28 and 29, the outer end of this section having a reduced stem portion 37 which is fitted into the end of the tubular track rod 28.

It is pointed out that the tubular track rod 28 is supported along its length at suitable intervals by hanger brackets similar to the brackets 31 but of a greater height so as to extend to the ceiling.

At the wide end of the frame, two hanger brackets 31 are secured by screws 33 to the main frame and by screws 35 to the ends of the track rods 29 and 30 which, like the track rod 28, are supported along their length at suitable intervals by hanger brackets similar to the hanger brackets 31, but of greater height to extend to the ceiling. The track rods 29 and 30 each extend at their inner ends slightly inwardly of the wide arcuate end edge of the opening 12, and are an equal distance from the pivoting axis of the switching arm 13.

The switching arm 13, shown in detail in Figs. 3 and 4, consists of a main arm portion 38 disposed within the opening 12 of the main frame with its upper and lower surfaces substantially in the horizontal plane of the upper and lower surfaces of the top plate portion 11 of the main frame, and at one end there is integrally formed an upwardly offset T-shaped mounting portion 39 which engages the upper surface of the top plate 11 adjacent the narrow end of the opening 12, a centrally bored bearing portion 40 being provided therein in which is engaged a pivot stud 41 fixedly secured to the top plate 11 in a mounting hole 42, the stud 41 having a head 43 engaging the upper side of the bearing portion 40, and a reduced threaded stem 44 engaged through the hole 42 and secured by a nut 45 which draws the shoulder at the upper end of the stem tight against the surface of the top plate 11. The T-shaped of the end 39 provides a relatively wide bearing surface which prevents any tendency of the switching arm to tilt, thus permitting a relatively loose bearing engagement with the stud 41.

At the other end of the switching arm there is provided an upwardly offset integrally formed plate portion 46 having a pair of outwardly projected divergent arms 47 and 48 which slidably engage the surface of the top plate 11 adjacent the wide arcuate end edge of the opening 12, the arm 47 having a block-like lug 49 integrally formed thereon which is adapted in one position of the switching arm (Fig. 2) to abut the stop portion 26 of the frame, and the arm 48 having a similar block-like lug 50 which, in the other position of the arm (Fig. 8), abuts the stop lug 27 of the frame.

A hanger bracket 31 is secured to the underside of the switching arm 13 by screws 33 and has secured in its lower saddle portion 34, by means of screws 35, a switching track rod section 51. This switching track rod section is connected for swinging movement relatively to the inner end of the stub track rod section 36 about a swinging axis in vertical alignment with the swinging axis of the switching arm 13. Preferably this connection consists of a tightly coiled length of helical spring 52, which is fitted upon a reduced end portion 53 of the stub track rod section 36 and is similarly fitted to a reduced end portion 54 of the switching track rod section 51, the latter, like the track rod section 36, being of solid stock.

The opposed ends of the reduced end portions 53 and 54 are slightly spaced, as clearly shown in Fig. 1, this space being directly centered with respect to the swinging axis so that the switching track rod may, through swinging movement of the switching arm 13, be freely swung between its two positions. The closely coiled spring, which has an outside diameter corresponding to the diameter of the track rods, provides, in effect, a flexible connection section between the track rod sections which is substantially continuous therewith, so that the article supporting conveyor means will freely travel across the flexible connection. The length of the switching track rod 51 is such that the free end will be slightly spaced from the inner end of one or the other of the track rods 29 and 30 with which it is aligned, so that in switching from one position to the other the switching track rod is entirely free.

Upon the forward side of the main frame, substantially in lateral line with the swinging end of the switching arm, there is provided a vertically bored cylindrical bearing portion 55 integrally formed with the frame and having its upper end extended upwardly therefrom so that it is in a horizontal plane spaced above the horizontal plane of the upper surface of the plate portion 46 of the switching arm. Within the bearing portion 55 there is rotatably mounted an operating shaft 56, the shaft extending a substantial distance below the bearing portion and having at its lower end a right angularly bent handle extension 57. The shaft is restrained against upward vertical movement in the bearing portion by a washer 58 engaged thereon and engaging the lower end of the bearing portion 55, a cotter pin 59 being engaged through the shaft directly below the washer.

The upper end of the shaft projects above the upper end of the bearing portion and has secured thereon a bell crank toggle lever 60. The short arm of the bell crank lever is centrally slit, as at 61, from its outer end to the shaft engaging hole 62 and the two sides of the slit arm are drawn together by a bolt 63 to thus clamp the lever about the shaft. One side of the short slit arm of the lever is provided with a projecting nose portion 64 which, in one operative position, engages the outer surface of the stop member 26, as shown in Fig. 2, and the long arm of the lever is provided at a point intermediate its outer end and the shaft with a projected stop portion 65 which, in the other operative position of the lever, as shown in Fig. 8, contacts the end of the stop portion 26, the movement of the lever between its two operative positions being slightly in excess of 180 degrees, for a purpose to presently more fully appear.

In the outer end of the long arm of the lever there is provided a vertical hole 66 in which is engaged the upwardly bent end 67 of an arcuate spring link member 68, the other end of which is provided with a downwardly bent end 69 which is engaged in a vertical hole 70 provided centrally in the switching arm adjacent its forward end. This spring is held in substantially flat relation in engagement with the plate portion 46 of the switching arm by means of a horizontal diagonally extending lug 71 integrally formed upon the plate portion, its length being such as to allow for full sliding movement of the spring beneath it. A similar lug 72 is also provided on the plate portion extending diagonally in the other direction from the lug 71, the pair of lugs 71 and 72 enabling the switching arm to be used either with a frame, as shown in Fig. 2, which may for convenience be called a right hand frame, and with a frame such as shown in Fig. 10, which may be called a left hand frame, in which latter case the spring is engaged beneath the lug 72. In this latter arrangement, all of the parts are identical with the form shown in Fig. 2, except that the frame and the parts associated therewith are in reverse arrangement.

It will be noted from Fig. 2 that in the operative position as shown therein, with the switching arm and switching track rod aligned with the longitudinally aligned track rods 28 and 29, the end 67 of the spring is moved to the left of the dead center line of the bell crank lever, which would be a straight line intersecting the spring end 69 and the vertical axis of the shaft 56. As the spring end 67 is moved past the dead center by the bell crank lever, the distance between the spring ends is increased causing the spring to be tensioned through a decrease in the curvature of its bow. When so tensioned, the ends of the spring tend to move toward each other to resume the normal curvature of the spring and thus exert a clockwise force upon the bell crank lever to force its nose portion 64 against the stop portion 26, and a counter-clockwise force upon the switching arm to force its lug 49 against the inner surface of the stop portion 26. Thus the switching track rod is positively retained in its operative position in alignment with the track rod 29.

In order to switch to the other position in alignment with the track rod 30, the handle 57 of the shaft 56 is first rotated in counter-clockwise direction, as indicated in Fig. 2, to force the end 67 of the spring to the right of dead center, this action taking place as the handle moves from the full line to the dotted line position. Up to this point there is no movement of the switching arm, and when this point is reached the spring is in its normal untensioned or inert state, indicated by the dot-and-dash lines. By continuing the counter-clockwise movement of the handle, the bell crank lever is moved from the dot-and-dash line position shown in Fig. 2 to the dot-and-dash line position shown in Fig. 8, and during this movement the inert spring acts as a substantially rigid link between the bell crank lever and the switching arm to move the switching arm to its position as shown in Fig. 8, bringing the lug 50 into contact with the stop lug 27 and the switching track rod into axial alignment with the track rod 30.

In order to retain this position under the pressure of the spring, the handle is moved from the dotted line position of Fig. 8 to the full line position, carrying the end 67 of the spring over dead center where the distance between the spring ends is decreased causing the spring to be tensioned through an increase in the curvature of its bow, so that as it tends to resume its normal curvature its ends tend to move away from each other, thus exerting pressure in counter-clockwise direction upon the bell crank lever to retain its stop portion 65 against the end of the stop portion 26, and in clockwise direction upon the switching arm to force its lug 50 against the stop lug 27 of the frame. In again moving to the Fig. 2 position, the handle is first moved from the full line to the dotted line position, moving the spring end 67 over dead center and bringing the spring from its tensioned to its inert state, whereupon continued movement to the position shown in Fig. 2 brings the switching arm and the switching track rod section 51 into alignment with the track rod 29, and thereupon tensions the spring to retain the aligned position, the latter operation being through movement from the dot-and-dash line to the full line position of Fig. 2.

When the switching track rod section 51 is in alignment with either one of the track rods 29 and 30, the other track rod presents an open end within the switch device. In order to prevent one of the article carrying members upon such track rod from running off the open end, stop means are provided in relation to each of the rods 29 and 30, which are respectively moved to an inoperative position to allow free passage of the conveyor hangers when the switching rod is in alignment therewith, and are moved into stopping relation when the switching rod is out of alignment and the end of the track rod is open.

Each of the stop means employed consists of a hook member 73 having a pin 74 at its upper end pivotally mounted in a depending lug 75 formed upon the main frame contiguous to the arcuate wide end of the opening 12, the swinging axis being in a vertical plane coincident to the axis of the associated track rod, and the pivot pin 74 being retained in engagement with the lug by the disposition of the end of the upper mounting plate portion 32 of the hanger member 31 supporting the end of the track rod at the side of the hook member remote to the lug. As clearly indicated in Figs. 5–9, the hooked lower ends of the hook members of the two track rods 29 and 30 each has its open side disposed inwardly so that in moving into hooked relation each hook member swings inwardly, and in moving into inoperative relation it swings outwardly.

Outward swinging movement is imparted to the hook members to disengage them by means of a downwardly offset forwardly projecting finger 76 integrally formed upon the lower side of the switching arm 13 adjacent its forward end. This finger is adapted, as the switching arm is moved from one position to the other, to engage the hook member of the track rod, into alignment with which the switching track rod and the switching arm are moved, to thus swing the hook member outwardly into inoperative position. As the switching arm moves from alignment with one track rod to the other, the hook member which has been held in inoperative position moves by gravity into its operative position in relation to the track rod from which the switching track rod and switching arm are being moved.

Thus, as clearly shown in Figs. 1–7, the switching track rod section 51 is in alignment with the track rod 29 and the hook member in relation to the track rod 29 is in its upwardly swung inoperative position to which it has been moved through contact of the finger 76 therewith. The rollered hanger carrying an article to be conveyed, and indicated in Figs. 1, 5 and 6 at 77 by the dot-and-dash lines, may move freely in either direction along the aligned track rod 29 and the track rod section 51. At the same time the hook member in relation to the track rod 30 has swung downwardly by gravity into hooking relation with the open end of the track rod 30 so that it provides an effective barrier against movement of a conveyed article over the end of the track rod 30.

As shown in Figs. 8 and 9, the switching track rod is in alignment with the track rod 30 and its hook member is swung outwardly into inoperative position by the finger 76, the hook member of the track rod 29 being swung downwardly by gravity into hooked relation therewith.

While the manually operable actuating handle and its associated parts connecting it to the switching arm 13 are shown at the forward side of the frame in Figs. 1–9, and at the rearward side in Fig. 10, it will be understood that such means may, if desired, be provided in either form at the opposite side.

As shown in Fig. 11, the shaft 56, which terminates directly below the bearing portion 55, is extended upwardly from the bell-crank toggle lever 60 and then bent downwardly at a wide angle to provide a handle extension having a vertically disposed hand grip portion 57a. The handle extension is disposed sufficiently high so that it will not interfere with the passage of articles carried by the conveyor system, and is at a safe height so as not to be bumped into by the heads of persons moving about the establishment. The handle may be operated with extreme ease due to its movement in a wide lateral arc without twisting of the wrist of the operator.

What is claimed is:

1. A switch device to connect a single track rod to either of a pair of branch track rods, comprising a frame, means depending from the frame for supporting said single track rod and said branch track rods with the ends of said branch track rods longitudinally spaced an equal distance from said single track rod, switching means including a switching track rod section, means mounting said switching track rod section for movement between respective operative positions wherein the switching track rod section in one position extends in connecting relation between the end of said single track rod and one of said branch track rods, and in the other position extends in connecting relation between said single track rod and the other of said branch track rods, a pair of stop members carried by said frame against which said switching means is engaged in its respective operative positions, actuating means for imparting movement to said switching track rod section, and spring means for yieldably pressing said switching means against said respective stop members in its respective operative positions.

2. A switch device to connect a single track rod to either of a pair of branch track rods, comprising a frame, means depending from the frame for supporting said single track rod and said branch track rods with the ends of said branch track rods longitudinally spaced an equal distance from said single track rod, switching means including a switching track rod section, means mounting said switching track rod section for movement between respective operative positions wherein the switching track rod section in one position extends in connecting relation between the end of said single track rod and one of said branch track rods, and in the other position extends in connecting relation between said single track rod and the other of said branch track rods, actuating means for imparting movement to said switching track rod section comprising a manually operable toggle lever mounted on said frame, a spring link member connected between said lever and said switching means for moving said switching means between its operative positions through turning of said lever, continued turning of said lever to a past dead center position following movement of said switching means to its respective operative positions adapted to tension said spring link member to yieldably retain said switching means in either of said positions.

3. A switch device to connect a single track rod to either of a pair of branch track rods, comprising a frame, means depending from the frame for supporting said single track rod and said branch track rods with the ends of said branch track rods longitudinally spaced an equal distance from said single track rod, switching means including a switching track rod section, means mounting said switching track rod section for movement between respective operative positions wherein the switching track rod section in one position extends in connecting relation between the end of said single track rod and one of said branch track rods, and in the other position extends in connecting relation between said single track rod and the other of said branch track rods, actuating means for imparting movement to said switching track rod section comprising a manually operable toggle lever mounted on said frame at one side, an arcuate spring link member connected between said lever and said switching means adapted in one direction of turning of said lever to pull said switching means to one of its operative positions and in the other direction of turning of said lever to push said switching means to the other of its operative positions, continued turning of said lever to a past dead center position following movement of said switching means to its respective operative positions adapted following said pulling movement to decrease the curvature of said spring link and increase the distance between its ends whereby it is tensioned to pull said switching means into its one operative position, and following said pushing movement to increase the curvature of said spring link and decrease the distance between its ends whereby it is tensioned to push said switching means into its other operating position.

4. The invention as defined in claim 3, wherein said frame has a pair of stop members against which said switching means is engaged in its respective operative positions, and said toggle lever is mounted at one side of said frame outwardly of one of said stop members.

5. The invention as defined in claim 2, wherein said actuating means includes a vertical shaft fixed to said toggle lever and a handle extension movable in a wide lateral arc to turn said shaft.

6. The invention as defined in claim 2, wherein said actuating means includes a vertical shaft fixed to said toggle lever and a handle extension having a vertically disposed hand grip portion movable in a wide lateral arc to turn said shaft.

References Cited in the file of this patent

UNITED STATES PATENTS

| Number | Name | Date |
| --- | --- | --- |
| 893,555 | Sullivan | July 14, 1908 |
| 961,433 | Fitzgerald | June 14, 1910 |
| 1,067,939 | Rassman | July 22, 1913 |
| 1,150,483 | Barber | Aug. 17, 1915 |
| 1,333,183 | Neller | Mar. 9, 1920 |
| 1,355,618 | Remsberg | Oct. 12, 1920 |
| 1,454,188 | Rasmussen | May 8, 1923 |
| 1,595,617 | Raby | Aug. 10, 1926 |
| 1,602,378 | Harris | Oct. 5, 1926 |
| 1,796,255 | White | Mar. 10, 1931 |
| 2,341,162 | Salvador | Feb. 8, 1944 |
| 2,434,523 | Sheets | Jan. 13, 1948 |
| 2,590,070 | Shelby | Mar. 18, 1952 |
| 2,733,033 | Gunderson | Jan. 31, 1956 |

FOREIGN PATENTS

| Number | Country | Date |
| --- | --- | --- |
| 937,209 | France | Mar. 1, 1948 |